Figures 1, 2:
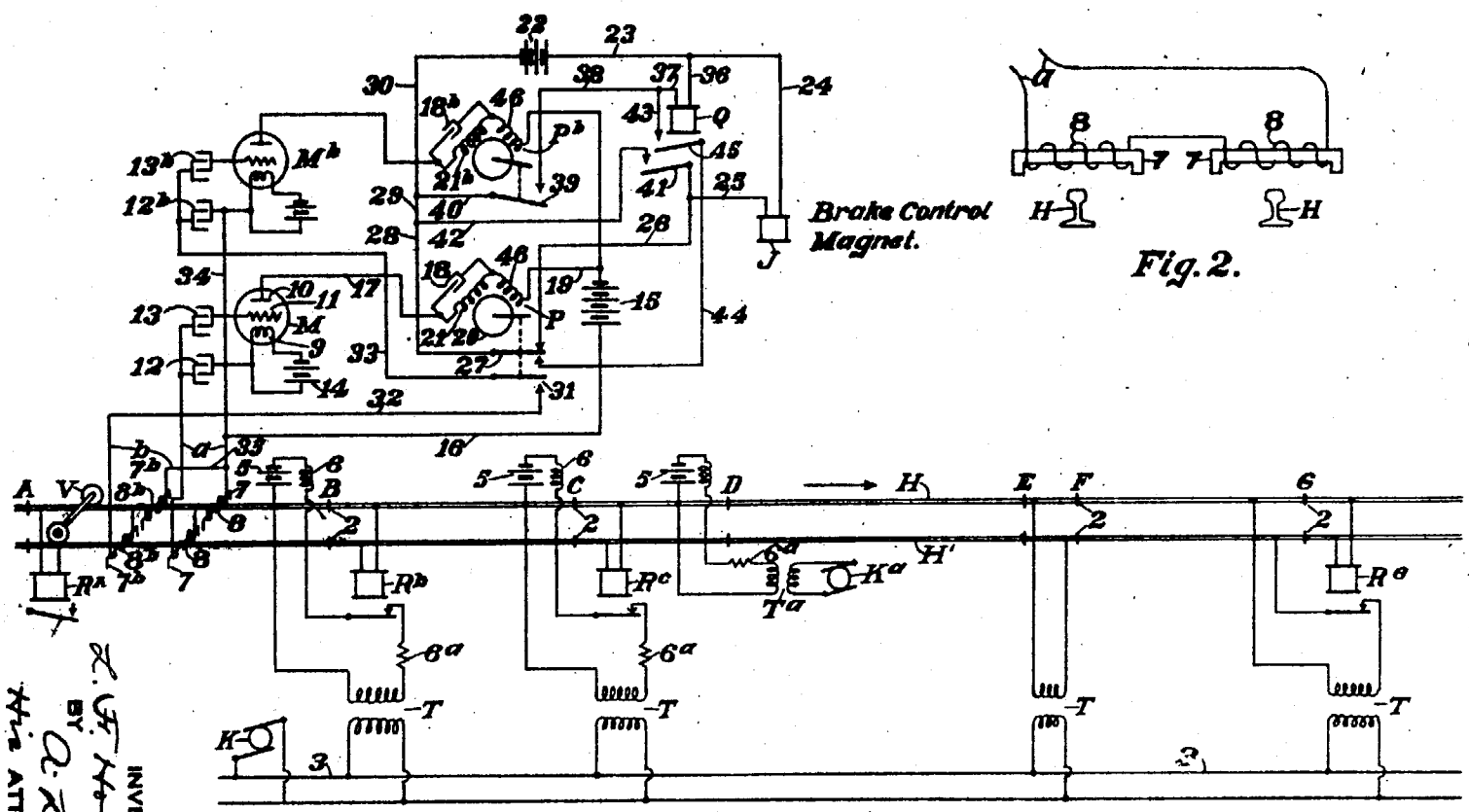

BEST AVAILABLE COPY

Feb. 23, 1926. Re. 16,277

L. F. HOWARD

RAILWAY TRAFFIC CONTROLLING APPARATUS

Original Filed Sept. 6, 1916

INVENTOR:
L. F. Howard,
BY A. R. Vencill
His ATTORNEY

41

Reissued Feb. 23, 1926. Re. 16,277

UNITED STATES PATENT OFFICE.

LEMUEL F. HOWARD, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Original application filed September 6, 1916, Serial No. 118,632. Renewal application filed May 20, 1918, Serial No. 235,695. Continued and application filed June 25, 1918, Serial No. 241,733. Original No. 1,341,982, dated June 1, 1920. Application for reissue filed July 21, 1920. Serial No. 398,028.

*To all whom it may concern:*

Be it known that I, LEMUEL F. HOWARD, a citizen of the United States, residing at Edgewood, in the county of Allegheny and State of Pennsylvania, have invented certain new and useful Improvements in Railway-Traffic-Controlling Apparatus, of which the following is a specification.

My invention relates to railway traffic controlling apparatus, and particularly to apparatus of the character in which a car or train is provided with traffic governing means which operate to retard the car or train or to otherwise control the same unless such governing means is effected either continuously or periodically by suitable means in the trackway responsive to traffic conditions in advance. Such control I will herein term "positive" control and the territory or portion of trackway which is provided with means for thus co-operating with the train apparatus is hereinafter termed "positive control territory". One difficulty encountered in connection with systems of this character is the probability that a car or train provided with such governing means must at times travel over a portion of trackway not equipped with means for affecting the train carried means in this manner, which portion of trackway is hereinafter termed "non-positive control territory". One object of my invention is the provision of means operating automatically to render the traffic governing means ineffective to control the car or train while the car or train is in the non-positive control territory, and for again restoring such governing means to its normal controlling condition when the car or train again passes into positive control territory.

The original patent, on which the present re-issue application is based, was granted on an application which was a continuation of my earlier application filed May 20, 1918, Serial No. 235,695 (which latter was a renewal of my application filed September 6, 1916, Serial No. 118,632).

I will describe one form of traffic controlling apparatus embodying my invention, and will then point out the novel features thereof in claims.

In the accompanying drawing, Fig. 1 is a diagrammatic view showing one form of signaling system embodying my invention. Fig. 2 is a view showing more in detail the means shown in Fig. 1 for transferring energy from the track rails to the governing means on the car or train.

Similar reference characters refer to similar parts in each of the views.

Referring to Fig. 1, the reference characters H and H′ designate the track rails of a railway over which traffic normally moves in the direction indicated by the arrow, said rails being divided into block sections A—B, B—C, etc., by insulated joints 2.

The block sections A—B, B—C, and F—G, are each supplied at times with an alternating traffic controlling current which may be of any suitable frequency, such for example as 60 cycles per second, these sections constituting the part of the railway which I have termed "positive control territory". The intermediate territory C—F, which is not supplied with such current is the "non-positive control territory". Located adjacent the entrance end of the non-positive control territory is a short "cut-out" section C—D, and located adjacent the exit end of this territory is a short "cut-in" section E—F, which sections are utilized for the purpose and in the manner hereinafter explained.

K is a generator of alternating traffic controlling current, the terminals of which are connected to transmission mains 3. This current is supplied to the rails of each section in the positive control territory by a transformer T the primary of which is connected with the transmission mains and the secondary with the track rails adjacent the exit end of the section. The supply of current from each transformer T to the corresponding block section is controlled by means of a track relay connected across the rails of the section in advance and at the entrance end thereof, each relay being designated by the reference character R with an exponent corresponding to the location. Each relay R is energized by means of a battery 5 connected across the track rails at the exit end of the corresponding section. Included in series with each battery 5 is an impedance coil 6 which limits the flow therethrough of traffic controlling current from the adjacent transformer T to a negligible value. A resistance $6^a$ is included in the secondary circuit of each transformer T except at location G to prevent such secondary from acting as a short circuit for the adjacent battery 5.

It will be evident from the foregoing that when a section is unoccupied and the rails thereof are intact, the relay R for such section will be energized so that traffic controlling current will be supplied to the rails of the section next in the rear. When, however, a section is occupied, the relay for such section will be de-energized, so that traffic controlling current will not be supplied to the rails of the section next in the rear.

In order to render the governing means upon the railway vehicle ineffective when the vehicle is in the non-positive control territory, I provide means for supplying "cut-out" current to the rails of the short section C—D at the entrance end of such territory. This cut-out current differs from the traffic controlling current, preferably in frequency, and is supplied by a transformer $T^a$ the primary of which is connected with a generator $K^a$ and the secondary of which is connected across the rails of section C—D. The cut-out current may be 90 cycles for example.

The "cut-in" section E—F at the exit end of the non-positive control territory is supplied with traffic controlling current from generator K, but no means are provided for governing this supply by traffic conditions in advance because it is desirable, for reasons which will appear hereinafter, that the supply of current to this section be continuous.

Located in block section A—B is a railway car or train which is represented by V, as a pair of wheels and an axle. This car or train I will refer to hereinafter as a "vehicle." The vehicle V is equipped with apparatus which is controlled by the currents supplied to the track rails, and which apparatus I will now explain. Mounted on the vehicle in advance of the forward axle thereof are two soft iron cores 7, 7 which carry two coils 8, 8 respectively. The two cores are located above the two track rails H and H′ respectively, as shown in Fig. 2, and are disposed transversely with respect to the rails. Each core is preferably U-shaped as shown, and is mounted with its legs pointing downwardly. When these cores are over rails which are carrying alternating current, part of the magnetic lines of force which surround each rail will pass through the corresponding core and so will create in the coil on such core an alternating current of the same frequency as that in the rail. The two coils 8 are included in a circuit *a*, and are connected in this circuit in such manner that the currents created therein by currents flowing in opposite directions in the two rails at a given instant are additive. The circuit *a* includes a condenser 12, this circuit being tuned to resonance at the frequency of the traffic controlling current, so that current in the rails from transformer T, that is, the traffic controlling current, creates an alternating current of the same frequency in circuit *a*. This current in circuit *a* is employed to control a traffic controlling relay P, but inasmuch as the current in circuit *a* is too feeble to reliably actuate a relay of rugged construction, I interpose between the circuit and the relay suitable amplifying means, which, as here shown, is in the form of an electron relay M. This relay comprises a vacuum bulb inclosing a filament 9, a plate 10, and a grid 11 interposed between the filament and the plate. The terminals of condenser 12 are connected with filament 9 and grid 11 respectively, so that alternating current in circuit *a* creates an alternating difference of potential between the grid and the filament. A blocking condenser 13 is preferably interposed between condenser 12 and grid 11 as shown. The filament 9 is constantly heated by a battery 14. The plate circuit of relay M is from a battery 15 through wire 16, filament 9, plate 10, wire 17, stator windings 21 and 46 of relay P, and wire 19 to battery 15. A condenser 18 is connected in multiple with winding 21 to displace the phases in the two relay windings. Owing to the variation in the liberation of electrons from the heated filament 9 due to the alternating difference of potential between the filament and the grid, the current from battery 15 is correspondingly varied, which variation represents a much greater energy value than the current in the circuit *a*. The alternating current energy in the plate circuit is sufficient to actuate the rotor 20 of relay P.

Relay P controls a brake control magnet J, the normal or usual circuit for which is from a battery 22 through wires 23 and 24, magnet J, wires 25 and 26, upper point of contact 27 of relay P, and wires 28, 29 and 30 to battery 22. The upper point of contact 27 is closed when relay P is energized, hence at such time magnet J is also energized. This magnet controls the brakes in such manner that when the magnet is energized the brakes are released, but that when the magnet becomes de-energized the brakes are applied or some suitable mechanism is set into operation so that the brakes will subsequently be applied if certain speed restrictions or other traffic requirements are violated.

Relay P of course becomes de-energized when the vehicle enters the non-positive control territory C—F. In order to keep magnet J energized so that the vehicle may proceed through this territory without restriction, I provide apparatus responsive to the cut-out current supplied by generator $K^a$ for removing magnet J from control by relay P. This apparatus comprises a second circuit *b* carried on the vehicle and including coils $8^b$ wound on cores $7^b$. These latter coils and cores are similar to the coils 8 and cores 7 hereinbefore described, and as here shown are likewise mounted on the vehicle in advance of the forward axle thereof. Circuit *b* includes a condenser $12^b$ and a contact 31 of relay P which contact is closed only when the relay is de-energized, this circuit being through coils $8^b$ in series, wire 32, contact 31, wire 33, condenser $12^b$, and wires 34 and 35 to upper coil $8^b$. This circuit *b* is tuned to resonance at the frequency of the cut-out current.

Current in circuit *b* controls a cut-out relay $P^b$, there being an electron relay $M^b$ interposed between the circuit and the relay $P^b$ similar to the electron relay M. The terminals of condenser $12^b$ are connected with the filament and grid respectively of electron relay $M^b$, through a blocking condenser $13^b$ so that alternating current in circuit *b* creates an alternating difference of potential between the grid and filament of $M^b$. The plate circuit for the electron relay $M^b$ includes battery 15 and relay windings $21^b$ and $46^b$, and will be apparent from the drawing. A condenser $18^b$ displaces the phases of the currents in the two windings of relay $P^b$.

The relay $P^b$ controls a stick relay Q, the pick-up circuit for which is from battery 22, through wires 23 and 36, relay Q, wires 37 and 38, contact 39 of relay $P^b$, and wires 40 and 30 to battery 22. Contact 39 is closed only when relay $P^b$ is energized; hence it follows that the pick-up circuit for relay Q is closed only when relay $P^b$ is energized. The stick circuit for relay Q is from battery 22, through wires 23 and 36, relay Q, wires 37 and 43, contact 45 of relay Q, wire 44, lower point of contact 27 of relay P, and wires 28, 29 and 30 to battery 22. It follows, therefore, that this stick circuit is closed only while relay Q is energized and relay P is de-energized.

The circuit for the brake control magnet J is provided with a branch around contact 27 of relay P, which branch includes contact 41 of relay Q. The entire branch circuit for this magnet J is from battery 22, through wires 23 and 24, magnet J, wire 25, contact 41 of relay Q, and wires 42, 29 and 30 to battery 22. It follows, therefore, that this branch circuit is closed only when relay Q is energized.

The operation of the entire apparatus is as follows:

As shown in the drawing, the vehicle V occupies block section A—B, whereas section B—C and section C—D are unoccupied. Relay $R^B$ being energized, traffic controlling current is supplied to the track rails of section A—B, so that relay P and brake magnet J are both energized. The vehicle may, therefore, proceed through section A—B without restriction. The rails of section B—C are likewise supplied with traffic controlling current, so that as the vehicle enters this section it may still proceed unimpeded. As the vehicle enters the cut-out section C—D, relay P will become de-energized, owing to the fact that traffic controlling current is not supplied to the rails of this section. Relay $P^b$ will, however, become energized because current of the cut-out frequency is supplied to the rails of this section from generator $K^a$. The pickup circuit for magnet Q is closed as soon as relay $P^b$ becomes energized, and the stick circuit for this relay also becomes closed as soon as the relay itself closes, because relay P is de-energized. As the train proceeds into section D—E relay $P^b$ will become de-energized, but relay Q remains energized, because its stick circuit continues to be closed at contact 27 of relay P. The energization of relay Q closes the branch circuit for the brake control magnet J, hence the vehicle may proceed through the non-positive control territory without restriction. As the vehicle enters the cut-in section E—F, relay P becomes energized owing to the fact that traffic controlling current is supplied to the rails of this section. This opens the stick circuit for relay Q, so that the latter relay then becomes de-energized whereby the control of brake magnet J is restored to relay P. As the vehicle enters F—G, magnet J continues to be energized because, as shown in the drawing, relay $R^G$ is closed.

The reason for the cut-in section E—F is to energize relay P and so restore the brake magnet J to control by this relay as soon as the vehicle enters the positive control territory even though section F—G may be occupied. It is obvious that if this cut-in section were not provided and section F—G were occupied, relay Q would continue to be energized so that the magnet J would continue to be under the control of relay Q.

It is, of course, understood that if section B—C were occupied while the vehicle V is in section A—B, relay P would be de-energized, so that brake control magnet J would be de-energized, and the vehicle would be subjected to whatever restrictions are imposed by this latter magnet.

Although I have herein shown and described only one form of traffic controlling apparatus embodying my invention, it is understood that various changes and modifications may be made therein within the scope of the appended claims without departing from the spirit and scope of my invention.

Having thus described my invention, what I claim is:

1. Railway traffic controlling apparatus comprising governing means on a vehicle arranged to retard the vehicle except when affected by traffic controlled means in the trackway, a portion of track equipped with such traffic controlled means and a portion of track not so equipped, and means adjacent the entrance end of the unequipped portion of track for rendering said governing means ineffective to retard the vehicle while the latter is passing through the unequipped portion of track.

2. Railway traffic controlling apparatus comprising governing means on a vehicle arranged to retard the vehicle except when affected by traffic controlled means in the trackway, a portion of track equipped with such traffic controlled means and a portion of track not so equipped, means adjacent the entrance end of the unequipped portion of track for rendering said governing means ineffective to retard the vehicle while the latter is passing through the unequipped portion of track, and means adjacent the exit end of said unequipped portion of track for restoring said governing means to its control of the vehicle.

3. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing in character from the traffic controlling current to the rails adjacent the entrance end of the non-positive control territory, a vehicle having two circuits one including means responsive to said traffic controlling current and the other including means responsive to said cut-out current, and traffic governing apparatus on said vehicle controlled by said two last-mentioned means.

4. Railway traffic controlling apparatus comprising a trackway divided into a positive control territory and a non-positive control territory, means for supplying alternating traffic controlling current to the rails of the positive control territory, but not to the rails of the non-positive control territory, a cut-out section adjacent the entrance end of the non-positive control territory, means for supplying to the rails of said cut-out section a cut-out currrent differing in frequency from the traffic controlling current, a vehicle having two circuits one including means responsive to said traffic controlling current and the other including means responsive to said cut-out current, and traffic governing apparatus on the vehicle controlled by said two last-mentioned means.

5. Railway traffic controlling apparatus comprising a trackway divided into a positive control territory and a non-positive control territory, means for supplying traffic controlling current to the rails of the positive control territory but not to the rails of the non-positive control territory, a cut-out section adjacent the entrance end of said non-positive control territory, means for supplying to the rails of said cut-out section a cut-out current differing from the traffic controlling current in frequency, a vehicle having two circuits resonant respectively to the traffic controlling current and the cut-out current, and traffic governing apparatus on said vehicle controlled by said two circuits.

6. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing in character from the traffic controlling current to the rails adjacent the entrance end of the non-positive control territory, a vehicle having two circuits one including means responsive to said traffic controlling current and the other including means responsive to said cut-out current, means for controlling one of said circuits by the other, and traffic governing apparatus on said vehicle controlled by the said means included in said two circuits.

7. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing in character from the traffic controlling current to the rails adjacent the entrance end of the non-positive control territory, a vehicle, a traffic controlling relay and a cut-out relay thereon controlled by energy received from the rails and the former or the latter of which is energized according as energy due to the traffic controlling current or the cut-out current is received on the vehicle, and traffic governing means on the vehicle controlled by said relays.

8. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing in character from the traffic controlling current to the rails adjacent the entrance end of the non-positive control territory, a Draftsma

41 vehicle, a traffic controlling relay and a cut-out relay thereon controlled by energy received from the rails and the former or the latter of which is energized according as energy due to the traffic controlling current or the cut-out current is received on the vehicle, means for controlling one of said relays by the other, and traffic governing means on the vehicle controlled by said two relays.

9. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing from the traffic controlling current in character to the rails adjacent the entrance end of the non-positive control territory, a vehicle, a traffic controlling relay and a cut-out relay thereon controlled by energy received from the rails and the former or the latter of which is energized according as energy due to the traffic controlling current or the cut-out current is received on the vehicle, a stick relay, traffic governing apparatus on the vehicle controlled by a contact of the traffic controlling relay which is closed when the relay is energized, a branch in the circuit for said traffic governing apparatus around said contact and including a contact of the stick relay which is closed when the stick relay is energized, means for energizing said stick relay when the cut-out relay is energized, and means for keeping the stick relay energized as long as the traffic controlling relay is de-energized.

10. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing in character from the traffic controlling current to the rails adjacent the entrance end of the non-positive control territory, a vehicle, a traffic controlling relay and a cut-out relay thereon controlled by energy received from the rails and the former or the latter of which is energized according as energy due to the traffic controlling current or the cut-out current is received on the vehicle, traffic governing means on the vehicle controlled by the controlling relay, a stick relay on the vehicle arranged when energized to render the traffic controlling relay ineffective to control said traffic governing means, means for energizing said stick relay when the cut-out relay is energized, and means for keeping said stick relay energized as long as the traffic controlling relay is de-energized when the stick relay has once become energized.

11. Railway traffic controlling apparatus comprising a trackway divided into a positive control territory and a non-positive control territory, means for supplying traffic controlling current to the rails of the positive control territory but not to the rails of the non-positive control territory, means for supplying cut-out current differing from the traffic controlling current in character to the rails adjacent the entrance end of the non-positive control territory, a vehicle, a traffic controlling relay and a cut-out relay thereon controlled by energy received from the rails and the former or the latter of which is energized according as energy due to the traffic controlling current or the cut-out current is received on the vehicle, traffic governing means on the vehicle normally controlled by said traffic controlling relay for permitting unretarded progress of the vehicle only when the traffic controlling relay is energized, and means on the vehicle set into operation when the cut-out relay is energized for removing said traffic governing means from control by said traffic controlling relay.

12. In combination, a stretch of railway track comprising a positive control territory and a non-positive control territory, a vehicle, means in said positive control territory for furnishing traffic controlling current to said vehicle, traffic governing apparatus on said vehicle controlled by said traffic controlling current, means for furnishing to said vehicle cut-out current distinctive from said traffic controlling current when the vehicle passes from said positive control territory to said non-positive control territory, and means on said vehicle responsive to said cut-out current for rendering said traffic governing apparatus ineffective to govern the vehicle.

13. In combination, a stretch of railway track comprising a positive control territory and a non-positive control territory, the former territory being equipped with track circuits supplied with alternating traffic controlling current, a railway vehicle, traffic governing means thereon responsive to said traffic controlling current in the track rails to permit unretarded progress of the vehicle, a cut-out section adjacent the entrance end of said non-positive control territory and supplied with alternating cut-out current, and means on the vehicle responsive to said cut-out current for permitting unretarded progress of the vehicle in the absence of said traffic controlling current.

14. Railway traffic controlling apparatus comprising a trackway divided into two positive control territories separated by a non-positive control territory, each positive control territory comprising a plurality of track sections, means for each section controlled by traffic conditions in advance for supplying traffic controlling current to the rails thereof, a vehicle, a traffic controlling relay thereon responsive to said traffic controlling current in the rails, governing means on the vehicle normally controlled by said relay and requiring that said relay be energized to permit unretarded movement of the vehicle, a cut-out section adjacent the entrance end of said non-positive control territory and constantly supplied with cut-out current, a cut-out relay on the vehicle responsive to said cut-out current, means on said vehicle operating when said cut-out relay is energized to remove said governing means from control by said traffic controlling relay and to maintain said latter condition until the traffic controlling relay again becomes energized, and a cut-in section adjacent the exit end of the non-positive controlling territory constantly supplied with traffic controlling current.

15. Railway traffic controlling apparatus comprising a trackway divided into two positive control territories separated by a non-positive control territory, each positive control territory comprising a plurality of track sections, means for each section controlled by traffic conditions in advance for supplying traffic controlling current to the rails thereof, a cut-out section adjacent entrance end of the non-positive control territory, means for supplying cut-out current to said latter section differing from the traffic controlling current in character, a cut-in section adjacent the exit end of the non-positive control territory, means for constantly supplying traffic controlling current to said cut-in section, a vehicle, governing means thereon normally arranged to retard the progress of the vehicle except when affected by said traffic controlling current in the rails, and means on the vehicle controlled by said cut-out current for rendering the governing means ineffective to retard the vehicle while the latter is passing through the non-positive control territory.

16. Railway traffic controlling apparatus comprising a trackway having a positive control territory and a non-positive control territory, said positive control territory comprising a plurality of track sections, means for each section governed by traffic conditions in advance for supplying traffic controlling current to the rails thereof, a vehicle, governing means thereon arranged normally to retard the vehicle except when affected by said traffic controlling current, and means located adjacent the entrance end of said non-positive control territory for rendering said governing means ineffective to retard the vehicle while the vehicle is passing through the latter territory.

17. In an automatic train control system for railways having signalled territory equipped for the continuous supply of energy to vehicles thereon and unsignalled territory not so equipped, the combination with automatic train control apparatus on a railway vehicle arranged to retard the vehicle except when supplied with energy from the trackway, of a stick relay for automatically rendering said apparatus ineffective to control the vehicle, and means partly on the vehicle and partly along the track for picking up said relay when the vehicle enters unsignalled territory.

18. In an automatic train control system for railways having signalled territory equipped for the continuous supply of energy to vehicles thereon and unsignalled territory not so equipped, the combination with automatic train control apparatus for a railway vehicle including a brake controlling valve and governing contacts therefor controlled by the energy received from the trackway, of a relay for shunting said contacts, and means partly on the vehicle and partly along the track for operating said relay when the vehicle enters unsignalled territory.

19. In an automatic train control system for railways having signaled territory equipped for the continuous supply of impulses to vehicles thereon and unsignaled territory not so equipped, the combination with automatic train control apparatus on a railway vehicle requiring the continuous supply of impulses to the trackway to permit unretarded progress of the vehicle, of impulse transmitting means partly on the vehicle and partly along the track for governing said apparatus in signaled territory in accordance with traffic conditions, and normally inactive means including the vehicle carried elements of said impulse transmitting means for rendering said train control apparatus ineffective to control the vehicle when it enters unsignaled territory.

20. In an automatic train control system for railroads having signaled territory equipped for the continuous supply of energy to vehicles thereon and unsignaled territory not so equipped, the combination with automatic brake control apparatus on a vehicle requiring the continuous supply of energy from the trackway to permit unretarded progress of the vehicle, of means for governing the apparatus in signaled territory in accordance with traffic conditions, and means for automatically rendering the apparatus ineffective to control the vehicle while it is traveling in unsignaled territory.

21. A railway traffic controlling system comprising brake control apparatus on a vehicle requiring the continuous supply of energy from the trackway to permit unretarded progress of the vehicle, traffic con- Draftsman trolled means on the trackway for continuously supplying energy to said apparatus, the railroad over which the vehicle runs having a portion of the track equipped with such traffic controlled means and a portion of track not so equipped, and means partly on the vehicle and partly on the track at the entrance to the unequipped portion of track for rendering said apparatus ineffective to retard the vehicle while it is traveling through said unequipped portion.

22. A railway traffic controlling system comprising brake control apparatus on a vehicle requiring the continuous supply of energy from the trackway to permit unretarded progress of the vehicle, traffic controlled means on the trackway for continuously supplying energy to said apparatus, the railroad over which the vehicle runs having a portion of the track equipped with such traffic controlled means and a portion of track not so equipped, means adjacent to the entrance end of the unequipped portion of the track for rendering said apparatus ineffective to retard the vehicle while it is traveling through said unequipped portion, and means adjacent to the exit end of said unequipped portion of the track for automatically restoring said apparatus to condition to govern the vehicle.

23. In an automatic train control system for railroads having signaled territory equipped for the continuous supply of energy to vehicles thereon and unsignaled territory not so equipped, the combination with a normally energized electromagnetic device on a vehicle adapted when de-energized to cause an automatic brake application, of means for controlling said device by said continuous supply of energy in signaled territory in accordance with traffic conditions, a normally open vehicle-carried circuit for said device, and means partly on the vehicle and partly on the track for closing said circuit when the vehicle enters unsignaled territory and for maintaining it closed while the vehicle travels through said unsignaled territory.

24. In an automatic train control system for railroads having signaled territory equipped for the continuous supply of energy to vehicles thereon and unsignaled territory not so equipped, the combination with a brake control device on the vehicle normally energized by said continuous supply of energy and adapted when de-energized to cause an automatic brake application, of a normally open circuit adapted when closed to maintain said device energized, and means for closing said circuit when the vehicle passes from signaled territory to unsignaled territory and for opening said circuit when the vehicle passes from unsignaled to signaled territory.

25. In an automatic train control system for railroads having signaled territory equipped for the continuous supply of energy to trains thereon and unsignaled territory not so equipped, the combination with automatic train control apparatus on a vehicle for governing the brakes thereof in accordance with said continuous supply of energy, means for automatically rendering said apparatus ineffective to control the vehicle when it enters unsignaled territory and for holding it ineffective until restored, and means adjacent to the exit end of unsignaled territory for restoring said means to normal.

26. In an automatic train control system for railroads having signalled territory equipped for the continuous supply of energy to vehicles thereon and unsignalled territory not so equipped, the combination with automatic train control apparatus on a vehicle for retarding the vehicle except when supplied with energy from the trackway, a relay adapted when energized to render said apparatus ineffective to retard the vehicle, and means partly on the vehicle and partly on the track for automatically energizing said relay when the vehicle passes from signalled to unsignalled territory.

27. In an automatic train control system for railroads having signalled territory equipped for the continuous supply of energy to vehicles thereon and unsignalled territory not so equipped, the combination with automatic train control apparatus on a vehicle for retarding the vehicle except when supplied with energy from the trackway, trackway means and vehicle-carried means co-operating to govern said apparatus in signalled territory in accordance with traffic conditions, a relay on the vehicle adapted when energized to render said apparatus inactive to control the vehicle, and normally inactive means for energizing said relay when the vehicle passes from signalled to unsignalled territory, said relay being maintained energized so long as the vehicle is travelling in unsignalled territory.

28. In an automatic train control system for railroads having signalled territory equipped for the continuous supply of energy to vehicles thereon and unsignalled territory not so equipped, in combination with automatic train control apparatus on a vehicle for retarding the vehicle except when supplied with energy from the trackway, a stick relay adapted when energized to render said apparatus ineffective to control the vehicle, and means for automatically energizing and de-energizing said stick relay as the vehicle enters and leaves unsignalled territory.

29. In an automatic train control system for railroads having signalled territory equipped for the continuous supply of energy to vehicles thereon and unsignalled territory not so equipped, the combination with automatic train control apparatus on a vehicle, of a control relay governing said apparatus, and requiring the continuous supply of energy from the trackway to permit unretarded progress of the vehicle, a stick relay adapted when energized to prevent operation of said train control apparatus, automatic means for energizing the stick relay when the vehicle passes from signalled to unsignalled territory, and a stick circuit for said relay including a back contact of the control relay.

30. In an automatic train control system for railroads having signalled territory equipped for the continuous supply of energy to vehicles thereon and unsignalled territory not so equipped, the combination with an electrically operable brake control device, requiring the continuous supply of energy from the trackway to energize said device, a normally open circuit for energizing said device, a relay adapted when energized to close said normally open circuit, and means for energizing and de-energizing said relay automatically as the vehicle enters and leaves unsignalled territory.

31. Railway traffic controlling apparatus comprising positive control territory and non-positive control territory, means for supplying signaling current to the positive control territory, means for supplying cut-out current to the track adjacent the entrance end of the non-positive control territory, a railway train, apparatus thereon responsive respectively to the said currents in the trackway, and governing means on the train controlled by said apparatus.

32. Railway traffic controlling apparatus comprising positive control territory and non-positive control territory, means located adjacent the entrance end of the non-positive control territory for supplying cut-out current to the track, a railway train, means thereon arranged normally to retard the train except when affected by energy received from the trackway in the positive control territory, and means on said train responsive to said cut-out current to render said governing means ineffective to retard the train while the latter is passing through the non-positive control territory.

33. Railway traffic controlling apparatus comprising positive control territory and non-positive control territory, means located in said positive control territory and controlled by traffic conditions therein for supplying energy to a train, means located adjacent the entrance end of the non-positive control territory for supplying a cut-out current to the track, governing means on a train arranged to normally retard the train except when affected by energy received from the trackway, and means on said train responsive to said cut-out current for rendering the governing means ineffective to retard the train in said non-positive control territory.

In testimony whereof I affix my signature.

LEMUEL F. HOWARD.